United States Patent [19]

Adams et al.

[11] 4,340,489
[45] * Jul. 20, 1982

[54] WASTEWATER TREATMENT PROCESS WITH PH ADJUSTMENT

[75] Inventors: V. Dean Adams, Logan; James H. Reynolds, Layton, both of Utah

[73] Assignee: International Environmental, Inc., Salt Lake City, Utah

[*] Notice: The portion of the term of this patent subsequent to Dec. 8, 1998, has been disclaimed.

[21] Appl. No.: 181,780

[22] Filed: Aug. 27, 1980

Related U.S. Application Data

[63] Continuation-in-part of Ser. No. 138,214, Apr. 7, 1980, Pat. No. 4,304,673.

[51] Int. Cl.³ .......................... C02F 1/72; C02F 1/52
[52] U.S. Cl. .................................. 210/718; 210/721; 210/750; 210/758; 210/764; 210/765
[58] Field of Search ............... 210/749, 750, 752, 757, 210/758, 764, 765, 604, 721; 424/162; 422/28, 30; 423/166, 539, 542, 543

[56] References Cited

U.S. PATENT DOCUMENTS

| | | | |
|---|---|---|---|
| 1,229,305 | 6/1917 | Menzies | 210/752 |
| 1,543,939 | 6/1925 | Machlachlan | 210/702 |
| 2,069,621 | 2/1937 | Patrick | 210/794 |
| 2,134,679 | 11/1938 | Allen | 424/162 |
| 2,171,203 | 8/1939 | Urbain et al. | 210/721 |
| 2,728,726 | 12/1955 | Basset | 210/696 |
| 3,690,860 | 9/1972 | Salutsky et al. | 424/162 |
| 3,948,774 | 4/1976 | Lindman | 210/721 |
| 4,029,574 | 6/1977 | Reimann | 210/604 |
| 4,123,355 | 10/1978 | Poradek et al. | 210/721 |
| 4,178,239 | 12/1979 | Lowther | 210/604 |

FOREIGN PATENT DOCUMENTS

| | | | |
|---|---|---|---|
| 532974 | 11/1956 | Canada | 424/162 |
| 1156172 | 5/1958 | France | 422/28 |
| 673615 | 7/1979 | U.S.S.R. | 210/752 |

OTHER PUBLICATIONS

M. B. Kim-E et al.; "Reclamation of Hyperion Secondary Effluent by Reverse Osmosis"; UCLA School of Eng. & Appl. Sci. Jun. 1975 (pp. 66-72).
A. J. Lingg; "Potential of Sulphur Dioxide for Disinfection of Waste Water".
Skinner et al.; "Inhibition and Inactivation of Vegetative Microbes"; Academic Press, 1976 (pp. 89-110).
Rahn et al.; "Effect of Increase in Acidity on Antiseptic Efficiency"; Ind. & Eng. Chem.; vol. 36, 2, (pp. 185-187) 1944.

*Primary Examiner*—Benoit Castel
*Attorney, Agent, or Firm*—Lyon & Lyon

[57] ABSTRACT

Wastewater is continuously disinfected by combining the wastewater with sufficient acid to reduce the pH of the wastewater to less than about 4 and with sufficient $SO_2$ that the wastewater has a selected free $SO_2$ content of at least 5 mg/liter. The combined $SO_2$/wastewater is maintained at the selected free $SO_2$ content for at least about 5 minutes. The wastewater can be treated by dissolving $SO_2$ into a first portion of the wastewater and combining the first portion with $SO_2$ dissolved therein with a second portion of the wastewater stream. $SO_2$ can be stripped from the wastewater, and the stripped $SO_2$ can be recycled.

45 Claims, 11 Drawing Figures

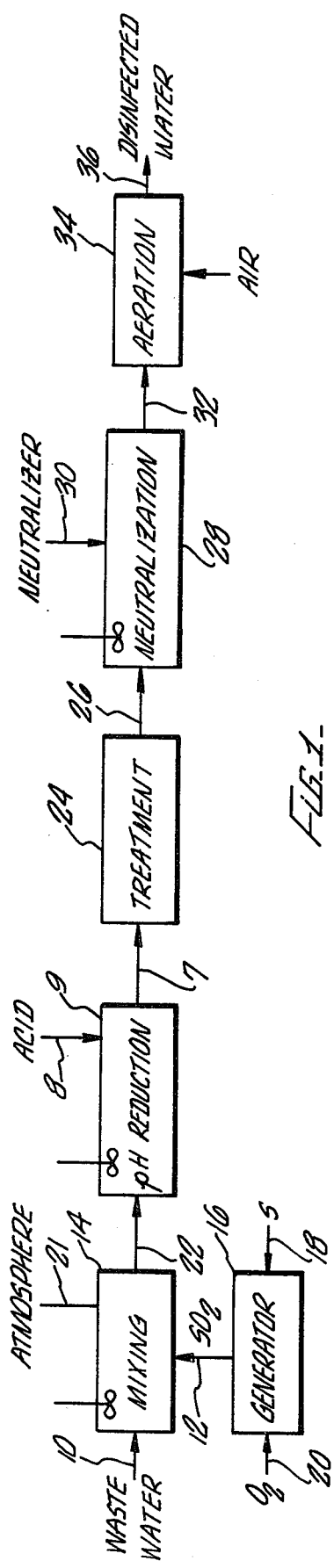
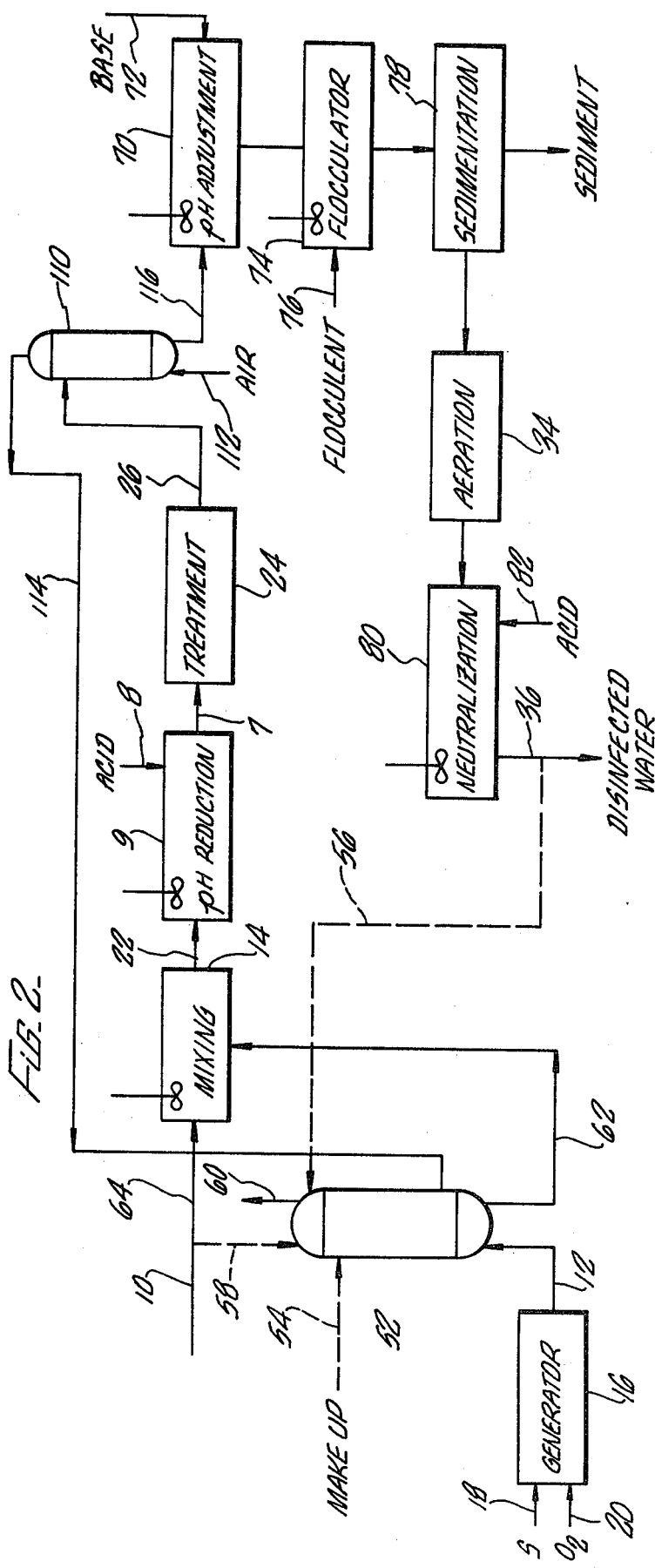
FIG. 1.
FIG. 2.

WASTEWATER TREATMENT PROCESS WITH PH ADJUSTMENT

CROSS REFERENCE

The application is a continuation-in-part application of Ser. No. 138,214, filed Apr. 7, 1980, now U.S. Pat. No. 4,304,673, entitled "Wastewater Treatment Process", which is incorporated herein by this reference.

BACKGROUND

The present invention is directed to the field of disinfecting wastewater.

The pollution problem posed by the disposal of wastewater from domestic and industrial sewage is a serious problem, especially in densely populated areas. In such areas, literally millions of gallons of untreated or inadequately treated wastewater from domestic and industrial sewage are discharged into streams, lakes, and the like. The discharge of such inadequately treated wastewater can cause severe health problems as well as being esthetically most undesirable. A variety of infectious microorganisms are found in municipal wastewaters, which, if the water is not disinfected, can lead to outbreaks of gastroenteritis, salmonellosis, shigellosis, typhoid, ear infections from *Pseudomonas aeruginosa*, and infectious hepatitis.

Chlorine has been traditionally employed for disinfecting water and wastewater. However, recent reports concerning the carcinogenic effects of chlorinated compounds resulting from chlorine disinfection have stimulated the search for less potentially harmful disinfectants. It has been found that the indiscriminate chlorination of wastewaters results in the formation of halogenated compounds which are toxic to aquatic life and potentially toxic to humans. Further, chlorination can satisfy prospective Federal water discharge standards only with such high dosages that expensive dechlorination is required as a further process step.

Researchers have investigated the use of ozone, chlorine dioxide, ultra-violet light, iodine, bromine, and bromine chloride as possible alternatives to chlorine disinfection of wastewater. Although all of these alternatives are effective in disinfecting water and wastewater to various degrees, in general, these alternatives are more costly than the use of chlorine. Thus, there is an urgent need to develop an effective, low cost, alternative disinfectant which meets current and future Federal, state, and local water pollution standards.

$SO_2$ has long been known to the food processing and wine industries for disinfection of equipment and beverages. For example, U.S. Pat. No. 623,105 issued Apr. 11, 1899 describes purifying sugar syrup by passing $SO_2$ into the syrup. Further, the use of $SO_2$ for purification of wastewater is described in U.S. Pat. Nos. 2,171,203, 3,522,173, 3,948,774, and 4,123,355. In the process, sufficient $SO_2$ is used to reduce the PH of the wastewater, generally in the order of 2 to 3.

The use of $SO_2$ for disinfecting wastewater is an economically attractive alternative to the use of chlorine for disinfecting wastewater, without the problem of generation of chlorinated carcinogenic compounds. However, none of the processes described in the aforementioned patents has achieved any significant acceptance. The processes have not demonstrated on any large scale the ability to meet the 1983 U.S. Environmental Protection Agency's standards for water discharge for irrigation, recreation, and industrial use. This is most likely the result of a lack of a fundamental understanding of how a process utilizing $SO_2$ for disinfecting wastewater is to be controlled and operated for efficient and effective disinfection. Further, large quantities of $SO_2$ are required.

Therefore, it is clear that there is an urgent need for an effective, low cost, and efficient process for disinfecting wastewater utilizing $SO_2$.

SUMMARY

The invention is directed to a process having the above-identified features. The invention is based upon the use of new techniques for disinfecting wastewater with $SO_2$. Further, the invention is based on the fundamental principle that in disinfecting wastewater with $SO_2$, it is essential to operate the process to maintain the free $SO_2$ content of the wastewater in a selected effective range and maintain the contact time between the wastewater and the free $SO_2$ above a minimum effective time.

According to the present invention, wastewater is continuously disinfected by combining the wastewater with $SO_2$ and with acid. Preferably the wastewater is combined with sufficient $SO_2$ and with sufficient acid so that the wastewater has a free $SO_2$ content no less than a selected free $SO_2$ content of at least about 5 mg/liter and a selected pH of less than about 4. Preferably the selected free $SO_2$ content is at least about 10 mg/liter and is less than about 100 mg/liter, and more preferably less than about 75 mg/liter. The $SO_2$ wastewater is maintained in a treatment zone at the selected free $SO_2$ content for at least about 5 minutes. The residence time in the treatment zone required for disinfecting the wastewater increases as the free $SO_2$ content of the wastewater decreases. Preferably the acid is added to the wastewater after the wastewater is combined with the $SO_2$ to be certain that the desired pH is achieved.

The treated wastewater is then withdrawn from the treatment zone for further processing, such as stripping of $SO_2$, neutralization, and aeration.

An advantage of using acid to reduce the pH of the wastewater instead of relying upon the $SO_2$ to reduce the pH of the wastewater is that much less $SO_2$ is required to achieve disinfection.

The wastewater stream can be treated by introducing the wastewater and $SO_2$ into a gas-liquid contactor. Alternatively, the wastewater can be combined with an aqueous stream containing dissolved $SO_2$. The aqueous stream can comprise disinfected wastewater from the process, and/or make-up water from an independent source.

In one version of the present invention, only a first portion of the wastewater is introduced into a gas-liquid contact zone into which $SO_2$ containing gas is also introduced. This results in at least a portion of the $SO_2$ being dissolved into the first portion of the wastewater. Then a second portion of the wastewater is combined with $SO_2$ by introducing substantially all of the first portion of the wastewater containing $SO_2$ directly into a mixing zone, and introducing a second portion of the wastewater into the mixing zone. Sufficient $SO_2$ is introduced into the contact zone so that the wastewater in the mixing zone has a free $SO_2$ content no less than a selected free $SO_2$ content of at least about 5 mg/liter. The wastewater is maintained at the selected free $SO_2$ content for at least about 5 minutes to obtain adequate disinfection.

An advantage of this "split" stream process is that only a portion of the wastewater need be passed through the gas-liquid contactor. This helps minimize the fouling that can occur when using gas-liquid contactors such as packed towers.

The process of the present invention is useful for effectively and efficiently disinfecting wastewater streams, even those having high BOD (Biochemical Oxygen Demand) and high COD (Chemical Oxygen Demand) values. The disinfected water produced is relatively clear and odor-free. Further, because chlorine is not used in the process, carcinogens produced with chlorine disinfection are not a problem.

DRAWINGS

These and other features, aspects, and advantages of the present invention will become better understood with reference to the following description, appended claims, and accompanying drawings where:

FIG. 1 is a flow sheet of a process according to the present invention;

FIG. 2 is a flow sheet showing another version of the present invention;

Figure 10:
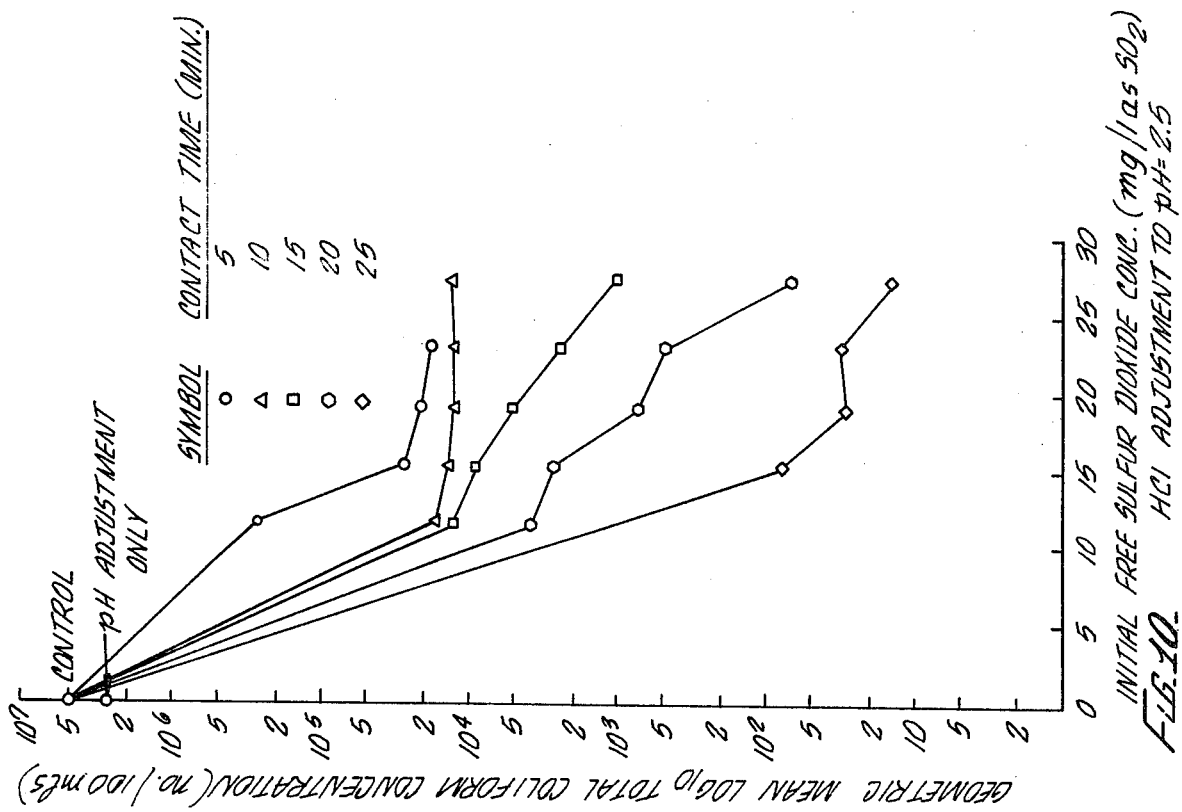
Figure 11:
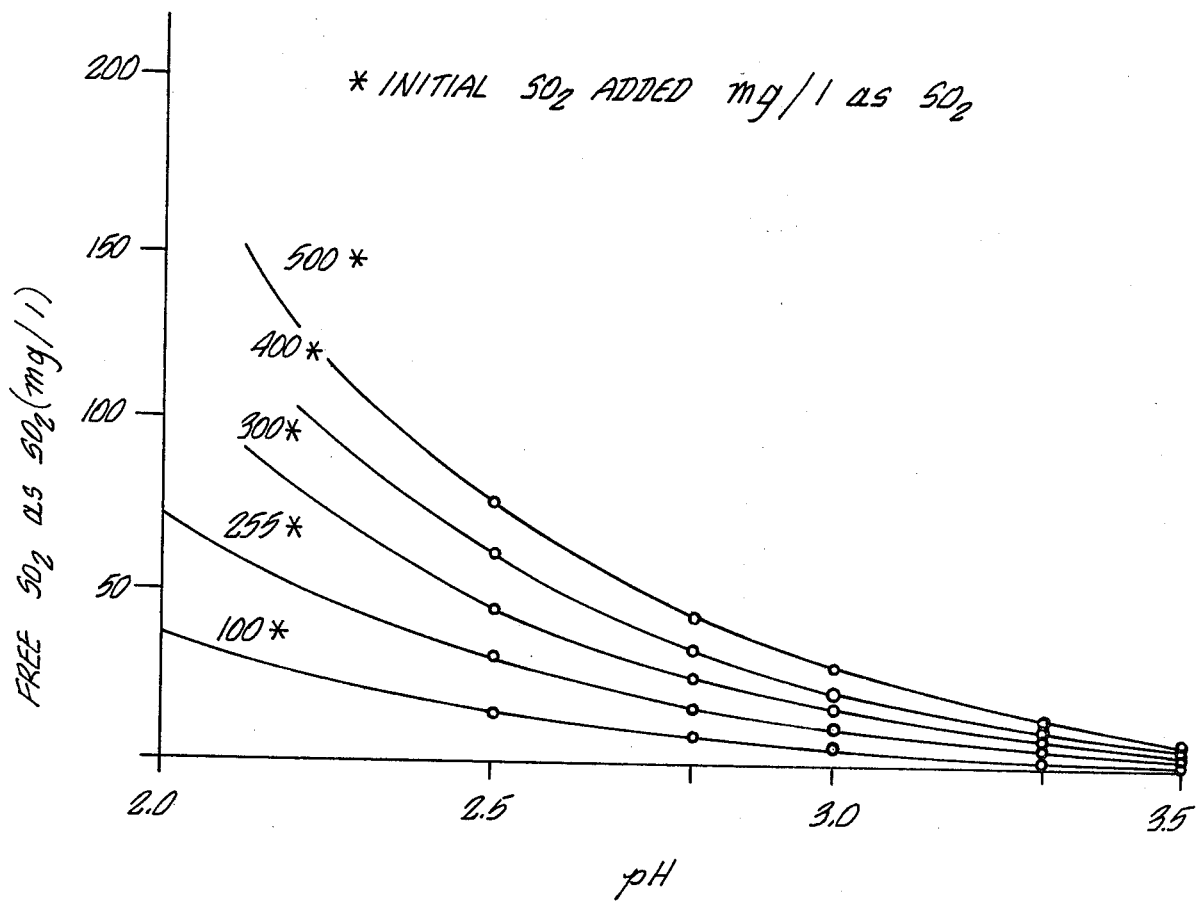

FIGS. 3-6 graphically present the results of tests on coliform disinfection using sulfuric acid pH adjustment and $SO_2$ on secondary treated sewage;

FIGS. 7-10 graphically present the results of tests on coliform disinfection using hydrochloric acid pH adjustment and $SO_2$ on secondary treated sewage; and FIG. 11 presents calculated free $SO_2$ as a function of pH and the amount of total $SO_2$ added to water.

DESCRIPTION

The present invention is directed to a process for disinfecting wastewater. The term "wastewater" as used herein is intended to mean any water requiring disinfection, including for example, industrial, agricultural, and domestic water, and some potable waters. The process can be useful for disinfection of potable water systems where a disinfection residual effect is not required. This especially applies to countries other than the United States.

The process of the present invention is principally directed to disinfecting water which has been derived from domestic sewage, i.e., sewage derived principally from dwellings, business buildings, institutions, and the like, which water can contain ground water, surface water, and/or storm water. Generally the wastewater treated has already undergone primary and secondary treatment according to conventional treatment processes. Surfactants and other materials can be added to the wastewater to enhance solution of sulfur dioxide added in the process of the present invention, and to minimize scale build-up. Generally speaking, the untreated wastewater from domestic sewage has a biochemical oxygen demand of about 250 parts per million and contains approximately 250 parts per million of suspended solids, organic solids constituting 40 to 50 percent of the total solids.

In a continuous process according to the present invention, with reference to FIG. 1, wastewater 10 is combined with sulfur dioxide containing combustion gas 12 in an agitated mixing zone 14. The sulfur dioxide containing combustion gas can be produced in a sulfur dioxide generator 16 by burning elemental sulfur 18 in the presence of oxygen 20. Alternatively, the gas containing $SO_2$ can be obtained from other suitable sources such as stack gas or compressed $SO_2$ in commercially available cylinders. The combined sulfur dioxide/wastewater 22 is withdrawn from the mixing zone 14 and combined with acid 8 in a pH reduction zone 9, and then passed via line 7 to a treatment zone 24 which provides a residence time of at least about 5, and preferably at least about 10 minutes. Wastewater is withdrawn from the treatment zone and passed via line 26 to an agitated neutralization zone 28 where it is combined with a neutralizing agent 30 such as calcium oxide. The neutralized treated wastewater 32 is then aerated in an aeration zone 34.

The individual steps of the process shown in FIG. 1 will now be described in detail.

The generator 16 used for burning elemental sulfur 18 can be a conventional burner such as a spray, cascade, rotary, or pan burner. The burner can be fed with solid or liquid sulfur. Burners particularly useful for producing sulfur dioxide which is to be absorbed by a water stream are described in U.S. Pat. Nos. 3,627,134, 3,907,510, and 4,039,289.

The source of the oxygen 20 used for burning sulfur is generally air, although air enriched with oxygen can be used.

Preferably the sulfur 18 is burned in the presence of the minimum amount of oxygen 20 required to insure substantially complete oxidation of sulfur to sulfur dioxide. Generally, this is about twice stoichiometric. Thus, the combustion gas 12 produced comprises sulfur dioxide and no more than about 10% by volume oxygen. The sulfur dioxide in the combustion gas 12 is preferably introduced into the mixing zone 14 without any additional oxygen. The reason for minimizing the amount of oxygen in the combustion gas is that introduction of oxygen into the wastewater can strip $SO_2$ from the wastewater and adversely affect the disinfection process.

Any constituents of the $SO_2$ containing combustion gas not dissolved in the mixing zone 14 are discharged via line 21 to the atmosphere. This can safely be done since substantially all of the $SO_2$ is dissolved in the wastewater in the mixing zone 14.

Rather than generating the sulfur dioxide on site at the wastewater disinfection plant, sulfur dioxide can be compressed into a liquid and stored and shipped in steel containers. The sulfur dioxide can be dissolved in the wastewater from the containers in a sulfonator such as those sold by Wallace & Tiernan Division of Pennwalt Corporation.

Numerous types of gas-liquid mixing apparatuses 14 can be employed in the process of the present invention. For example, spray systems such as spray towers and packed towers having cross-flow, counter-flow, or cocurrent flow can be used. Particularly preferred gas-liquid contactors are suitably packed columns to which the watewater scrubbing medium is introduced at the upper part of the column, as in the form of a spray, passing downwardly through the packed column. The downwardly flowing wastewater contacts a counter-flowing gas stream moving upwardly through the column. A particularly preferred packing is polyvinylchloride pipe, one inch outer diameter and one inch long.

Other types of scrubbers can also be used, the main criterion being that the scrubber allows sufficient contact time between the gas 12 and the wastewater 10 to insure that the sulfur dioxide is dissolved into the wastewater. Contact times less than one minute are generally required, and in the order of 30 seconds is generally adequate.

Suitable gas-liquid contacting apparatuses are described in U.S. Pat. Nos. 2,126,164, 3,107,951, 3,627,134, 3,775,314, 3,907,510, 4,039,289, 4,043,771, and 4,138,330.

The amount of sulfur dioxide that needs to be dissolved in the wastewater and introduced into the mixing zone 14 is that amount which insures that there is sufficient free sulfur dioxide in the treatment zone 24 to disinfect the wastewater in the treatment zone. Generally, at least about 10, and preferably at least about 20 milligrams of $SO_2$ are introduced into the mixing zone 14 per liter of wastewater introduced into the mixing zone. Generally no more than about 500, and preferably no more than about 300 mg of sulfur dioxide per liter of wastewater is required. Optimumly, about 160 mg of sulfur dioxide per liter of wastewater is used.

Sufficient sulfur dioxide is introduced to the mixing zone 14 that the wastewater in the treatment zone has a selected free $SO_2$ content of at least about 5 mg/liter, which is the minimum amount of free $SO_2$ required to insure that the wastewater is disinfected. This is the minimum amount of free $SO_2$ required to obtain substantially complete coliform disinfection in secondary treated sewage. As the free $SO_2$ content is increased above about 100 mg/liter, little, if any improvement in disinfection is obtained. Therefore, preferably the amount of sulfur dioxide added into the mixing zone 14 is limited so that the free $SO_2$ content of the wastewater in the treatment zone is less than about 100, and more preferably, less than about 75 mg/liter. Optimumly, the free $SO_2$ content of the wastewater is about 25 mg/liter.

The $SO_2$ content of the wastewater in the treatment zone 24 is expressed herein in terms of "free" $SO_2$ rather than total $SO_2$, because it has been determined that "free" $SO_2$ is a better measure of coliform disinfection than is total $SO_2$. Free $SO_2$ is calculated from knowledge of the pH and total $SO_2$ of the wastewater. The pH of the wastewater is determined with a conventional pH meter. The total $SO_2$ content of the wastewater is determined using the sulfite technique as described in *Standard Methods*, 14th edition, Pages 508-9 (APHA, 1975).

The calculation for free $SO_2$ utilizing total $SO_2$ and pH is based upon the reaction:

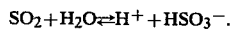
$$SO_2 + H_2O \rightleftharpoons H^+ + HSO_3^-.$$

The equilibrium constant $K_1$, for this reaction is about $1.72 \times 10^{-2}$ so that:

$$K_1 = ([H^+][HSO_3^-])/[SO_2] = 1.72 \times 10^{-2}$$

If it is assumed that $SO_3^{--}$ is negligible and $\gamma = 1.0$ for all species dissolved in the aqueous solution, the free $SO_2$ can easily be calculated. FIG. 11 presents plots of the free $SO_2$ content versus pH for total $SO_2$ added to the wastewater per liter of wastewater based on the assumption that all the $SO_2$ added is dissolved in the wastewater.

From the above equilibrium equations, it can be determined that the lower the pH of the wastewater (high $[H^+]$), the lower the $HSO_3^-$ content and the higher the free $SO_2$ content of the wastewater. Therefore, to obtain adequate free $SO_2$ in the wastewater, the pH of the wastewater in the treatment zone is maintained less than about 4, and preferably, less than about 3. The preferred range for the pH is from about 1 to about 4, and more preferably from about 2 to about 3, and the optimum value is about 2.5.

The amount of acid 8 added to the pH reduction zone 9 is sufficient to obtain the desired pH in the treatment zone 24. The more $SO_2$ added to the treatment zone, the less acid required for addition to the pH reduction zone, because the addition of $SO_2$ decreases the pH of the wastewater. To achieve a desired free $SO_2$ content, the less $SO_2$ added to the wastewater in the mixing zone 14, the more acid 8 required to be added to the wastewater in the pH reduction zone 9.

As shown in FIGS. 1 and 2, preferably the acid is added to the wastewater after the wastewater is combined with $SO_2$. The reason for this is that the addition of $SO_2$ reduces the pH of the wastewater, generally by an amount that is difficult to predict due to buffering agents which can be present in wastewater. Therefore, in order to obtain a desired pH value, it is preferred to add the acid to the wastewater after the $SO_2$ is added to the wastewater. However, it is within the scope of the present invention to add the acid to the wastewater before the $SO_2$ is added to the wastewater, or to add both the $SO_2$ and acid to the wastewater simultaneously.

The acid 8 used for reducing the pH of the wastewater can be any available suitable acid such as hydrochloric acid or sulfuric acid.

A suitable acid is not $SO_2$ or $SO_2$ dissolved in water. Thus, as used herein, the term "acid" when referring to an acid added to wastewater as part of the $SO_2$ disinfection process excludes $SO_2$ gas and $SO_2$ dissolved in water.

The mere addition of acid, even without $SO_2$ addition, can reduce the coliform content of wastewater, particularly when the pH of the wastewater is reduced to about two or less. Sulfuric acid appears to be more effective than hydrochloric acid in this reduction of coliform content.

Sufficient residence time is required in the treatment zone to disinfect the wastewater. A residence time of at least about 5 minutes, and preferably at least about 10 minutes is required for adequate disinfection. Residence times in excess of about 60 minutes provide little, if any, improvement in disinfection. Therefore, preferably the residence time is from about 10 to about 60 minutes, more preferably the residence time is less than about 40 minutes, and optimumly the residence time is about 20 minutes.

The treatment zone 24 is not agitated so that substantially plug flow is maintained in the treatment zone. This is to insure that all of the wastewater is subjected to at least about 10 minutes of treatment by $SO_2$.

Unlike prior art processes, it is preferred in the process of the present invention that substantially no particulate iron be added to the wastewater so that there is substantially no particulate iron in the treatment zone. This is because the particulate iron can react to form $FeSO_3$ which would reduce the free $SO_2$ content of the wastewater and interfere with the disinfection process. The vessels and process equipment in the present invention can be fabricated of iron.

The treated wastewater withdrawn from the treatment zone is neutralized in the neutralization zone 28 with a neutralizing agent 30. The neutralizing agent 30 can be an alkaline material such as an alkaline metal hydroxide, carbonate, or oxide. The use of calcium oxide, as for example, in the form of lime is advantageous in that it leads to the formation of calcium sulfate, which, under proper pH conditions precipitates from the wastewater and can be removed from the system.

The neutralizing agent can be added as a solid, as a slurry, or in solution.

In the neutralization zone, sufficient neutralization agent is added to increase the pH of the wastewater to be in the range of from about 6 to about 8, and optimumly to about 7.0, so that the wastewater can be discharged to the environment.

In the aeration zone 34, the neutralized treated wastewater is aerated with blown in air in an amount sufficient to raise its oxygen content, preferably to at least about 40 percent saturation. The addition of air strips out or reacts with any residual $SO_2$ and insures that the chemical oxygen demand and biochemical oxygen demand of the wastewater are reduced to required levels. Aeration can be obtained with equipment such as described in U.S. Pat. Nos. 2,126,164, 3,017,951, 3,775,314, 3,794,582, 4,043,771, and 4,138,330.

The disinfected water 36 discharged from the aerator can be safely discharged into streams, lakes, and other such bodies of water, and can be safely used for such industrial purposes as process cooling water.

An additional aeration step can be included in the process immediately before neutralization to strip out some sulfur dioxide from the wastewater to reduce the amount of neutralization agent required.

An alternate version of the present invention is shown in FIG. 2. The version of FIG. 2 uses the same pH reduction zone 9, $SO_2$ generator 16, mixing zone 14, and treatment zone 24 used in the version shown in FIG. 1. The version shown in FIG. 2 differs from the version shown in FIG. 1 in three respects, any combination of which can be used with the version shown in FIG. 1.

The first difference is that the combustion gas 12 containing $SO_2$ is not introduced as a gas into the mixing zone 14. Instead, the $SO_2$ is first dissolved in water and the water containing $SO_2$ dissolved therein is introduced into the mixing zone 14.

As shown in FIG. 2, the combustion gas 12 containing $SO_2$ is introduced to the bottom of a tower 52. Water is introduced into the top of the tower 52. The water can be fresh makeup water 54, recycled disinfected water 56, and/or a first portion 58 of the wastewater 10. Preferably only a first portion 58 of the wastewater is used for introduction into the tower 52. Generally the first portion of the wastewater comprises from about 10 to about 70, and preferably from about 30 to 50, volume percent of the total wastewater stream 10. Sufficient $SO_2$ is introduced into the gas-liquid contact zone 52 so that the wastewater 62 withdrawn from the contact zone has a free $SO_2$ content of at least 10 mg/liter, and preferably a free $SO_2$ content of less than 200 mg/liter. The exact concentration of free $SO_2$ in the wastewater 62 withdrawn from the contact zone 52 depends on the volume percent of wastewater 62 compared to the first portion of wastewater 10. As the volume percent of wastewater 62 increases, the concentration of free $SO_2$ in wastewater 62 decreases.

Any constituents of the combustion gas 12 not dissolved in the water in the tower 52 are released to the atmosphere via line 60. Water with $SO_2$ dissolved therein is withdrawn from the tower 52 via line 62 and introduced into the mixing zone 14 in which it is combined with a second portion 64 of the wastewater 10. As shown in FIG. 2, preferably none of the wastewater withdrawn from the contact zone 52 is recycled into the contact zone 52, i.e., it is introduced directly into the mixing zone 14.

An advantage of splitting the wastewater 10 into two streams 48 and 64 is that only a portion of the wastewater needs to be passed through the gas-liquid contactor 52. This helps minimize the fouling that can occur with a gas-liquid contactor 52 containing packing.

The amount of $SO_2$ introduced into the contact zone 52 is such that the wastewater in the mixing zone 14 has a free $SO_2$ content of at least about 5 mg/liter, but less than about 100 mg/liter, preferably less than about 75 mg/liter, and optimumly about 25 mg/liter.

The second difference between the version of the invention shown in FIG. 2 and the version shown in FIG. 1 is a scrubbing step immediately after treatment. The treated wastewater 26 is introduced to the top of a scrubbing tower 110 where $SO_2$ is stripped from the wastewater by a countercurrent flow of a gas such as air 112 blown into the bottom of the scrubber 110. About 90% of the $SO_2$ in the treated wastewater can be stripped in about 10 to about 15 minutes when the wastewater has a pH of from about 2 to about 2.5.

The stripped $SO_2$ can be recycled to treat incoming wastewater. This can be effected by withdrawing an air stream 114 containing stripped $SO_2$ from the scrubber 110 and introducing the air stream 114 into the tower 52. Alternatively, the $SO_2$ can be recovered from the air stream 114 in a separate absorption tower.

An advantage of the stripping operation is the need for less neutralization agent to neutralize the treated wastewater. A further advantage is capital and operating savings resulting from recyclying $SO_2$ so that less fresh $SO_2$ needs to be generated.

The third difference between the version of the invention shown in FIG. 2 and the version shown in FIG. 1 is the processing of the treated wastewater 26 from the treatment zone 24. Rather than just neutralizing and aerating the treated wastewater 26, it is subjected to $SO_2$ stripping as described above, and then the stripped wastewater 116 is subjected to further processing to remove solids and nutrients. Contaminants are withdrawn from the wastewater 26 by increasing its pH in a pH adjustment zone 70 to at least about 8, and preferably in the range of from about 9 to about 12. This can be effected with a base 72, and preferably is effected with calcium oxide. The wastewater is then flocculated in a flocculator 74 to which can be added a flocculating agent 76 such as aluminum sulfate. Flocculated material is removed from the flocculated wastewater such as by centrifuging or settling in a sedimentation zone 78, which can be a conventional gravity settler or decanter.

After the solids are removed from the wastewater in the sedimentation zone 78, the water is aerated to raise its oxygen content, preferably to at least about 40 percent saturation in an aeration zone 34 and then neutralized in a neutralization zone 80 with an acid 82 such as hydrochloric acid or sulfuric acid to a pH of about 7.0.

The key to effective disinfection of wastewater is maintaining the free $SO_2$ content in the treatment zone 24 in a range from about 5 to about 100 mg/liter, and preferably in the range of from about 10 to about 75 mg/liter. This is effected by monitoring the free $SO_2$ content of the wastewater in the treatment zone 24, and increasing and decreasing the amount of $SO_2$ used to treat the wastewater as required. The free $SO_2$ content of the wastewater can be monitored by direct measurement or by calculation from measured total $SO_2$ and measured pH.

The process of the present invention is generally operated at ambient temperature except for the burning of the sulfur. The process can normally be operated at any temperature normally found in wastewater. While the system can be operated at superatmospheric pressure, it is generally preferable because of energy considerations, to employ a gas-liquid contactor and wastewater and gas pressures such that excessive pressures are not encountered.

Further information regarding the disinfection of wastewater according to the present invention can be found in the report entitled "Evaluation of Sulfur Dioxide Disinfection," Reynolds and Adams, Utah Water Research Laboratory, Utah State University, December, 1979, which is incorporated herein by this reference.

The process of the present invention will be better understood with reference to the following example:

EXAMPLE

This example shows the effect of acid used, level of pH adjustment, the amount of $SO_2$ added to the wastewater and the effect of contact time on coliform disinfection.

The wastewater samples used were secondary treated sewage from the Hyrum City Wastewater Treatment Plan, Hyrum, Utah. Erlenmeyer flasks containing 500 ml undiluted secondary treated sewage, were placed on a magnetic stirrer. While stirring, the pH of the wastewater was reduced to 2.5 or 2.0 using 25 percent vol/vol $H_2SO_4$ or HCl. Thereafter, concentrated sulfurous acid was added as the source of $SO_2$. The flasks were placed on a shaker table and mixed at 125 rpm for contact times of 3, 5, 10, 15, 20, or 25 minutes. The flasks were neutralized to a pH of 7.0 using 5 N NaOH. Membrane filter analyses for total and fecal coliform were performed on the neutralized samples (APHA 1975). In addition, the initial $SO_2$ concentration was determined by titration according to *Standard Methods*, 14th edition, pp. 928–941 (APHA, 1975), which is incorporated herein by this reference.

This conventional membrane filter analyses technique for coliform content of aqueous samples comprises the steps of producing a plurality of subsamples of different dilutions from the original water sample. The goal is to produce a subsample that when filtered yields less than 200, and preferably from about 20 to about 80 coliform colonies. The subsamples are filtered with a sterile membrane and then the coliform caught by the membrane cultivated. The cultivated colonies are then counted and based on the number of colonies in the dilution of the subsample, the coliform content of the water sample can be calculated. It is important that the sample be neutralized to a pH of about 7.0 by an addition of a base such as sodium hydroxide. It has been learned that with samples having a pH of less than about 2 and containing $SO_2$, if a sample is not neutralized, the determined coliform values are low because the $SO_2$ kills the coliform and also the acidity of the sample retards the growth of the coliform on the membrane. The entire technique is done under sterile conditions.

Figure 4:
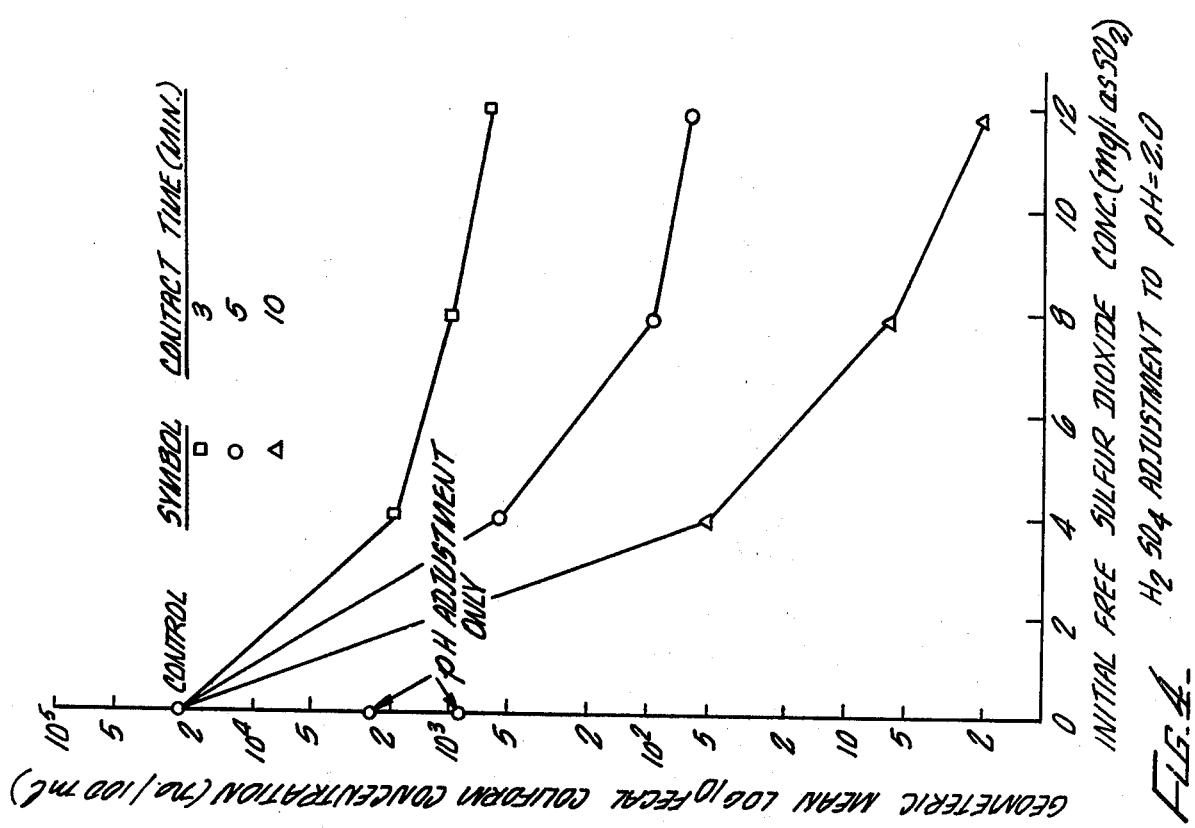
Figure 3:
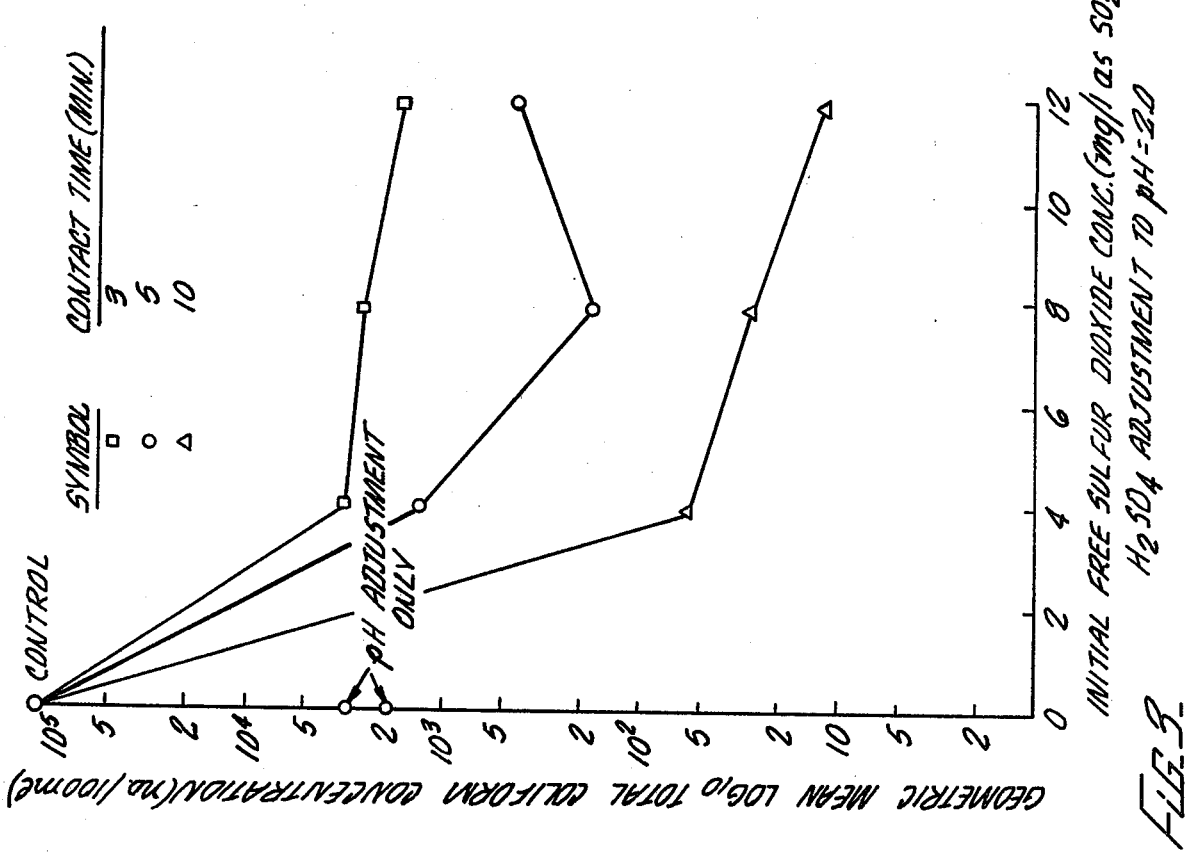
Figure 6:
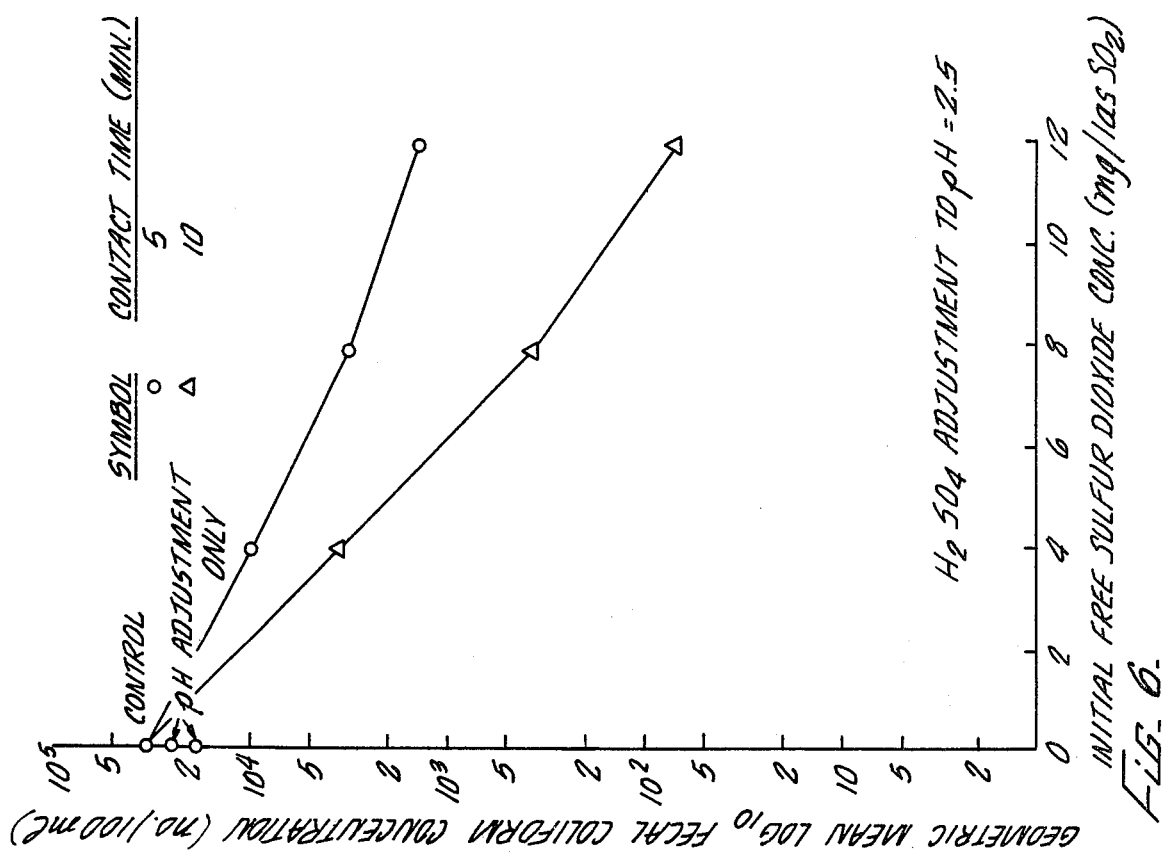
Figure 5:
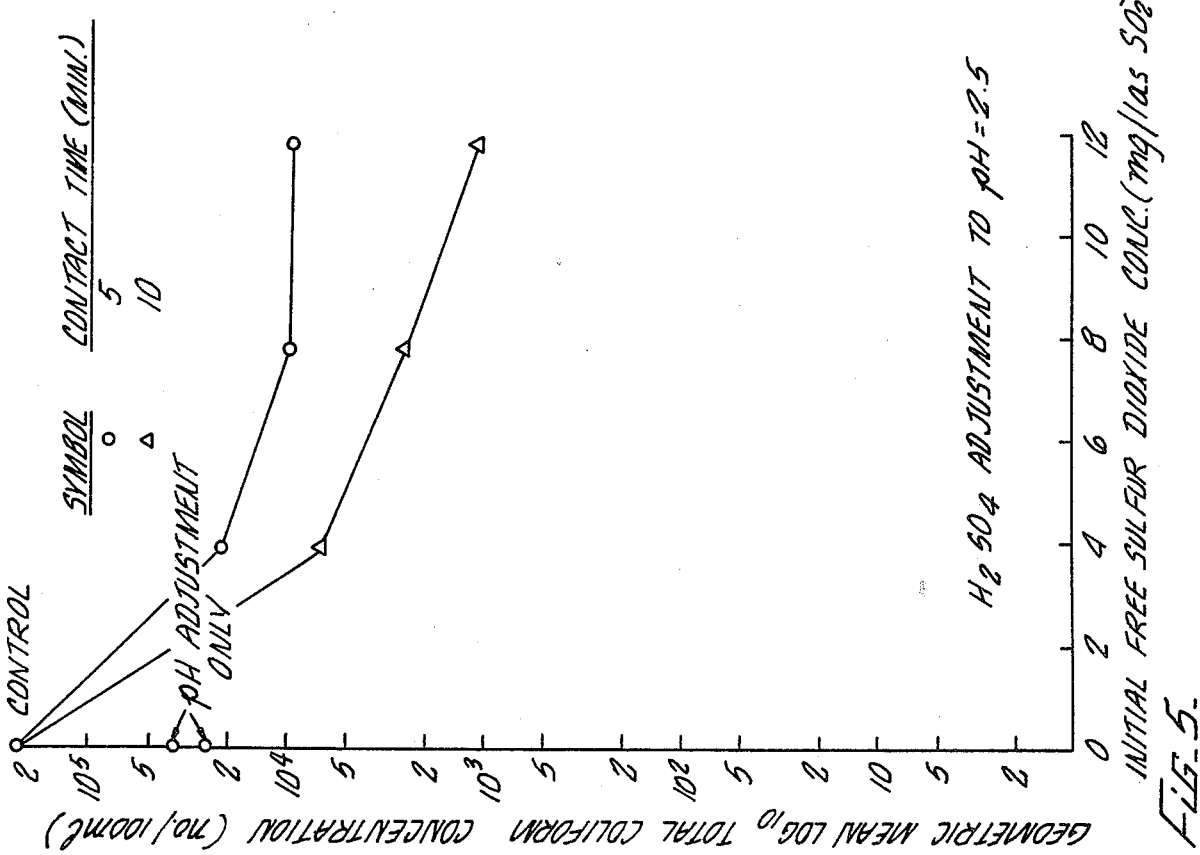
Figure 8:
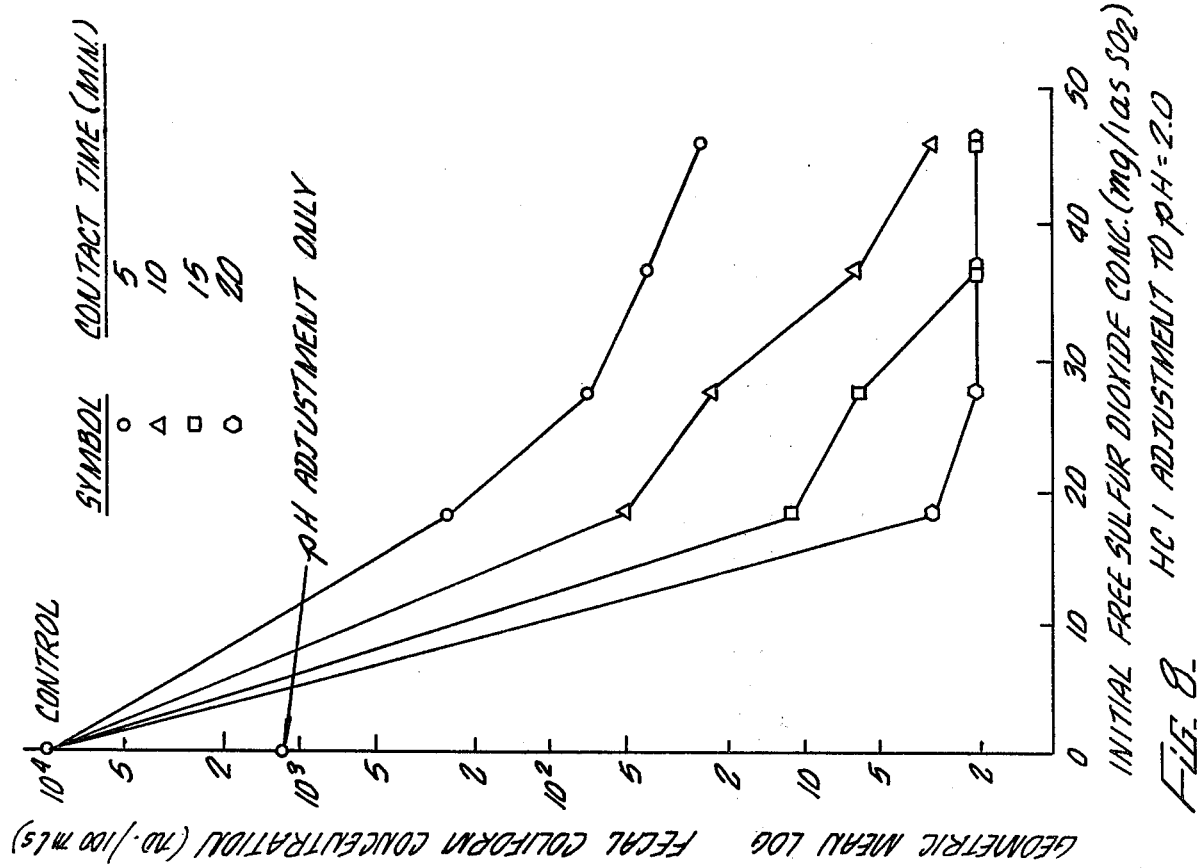
Figure 7:
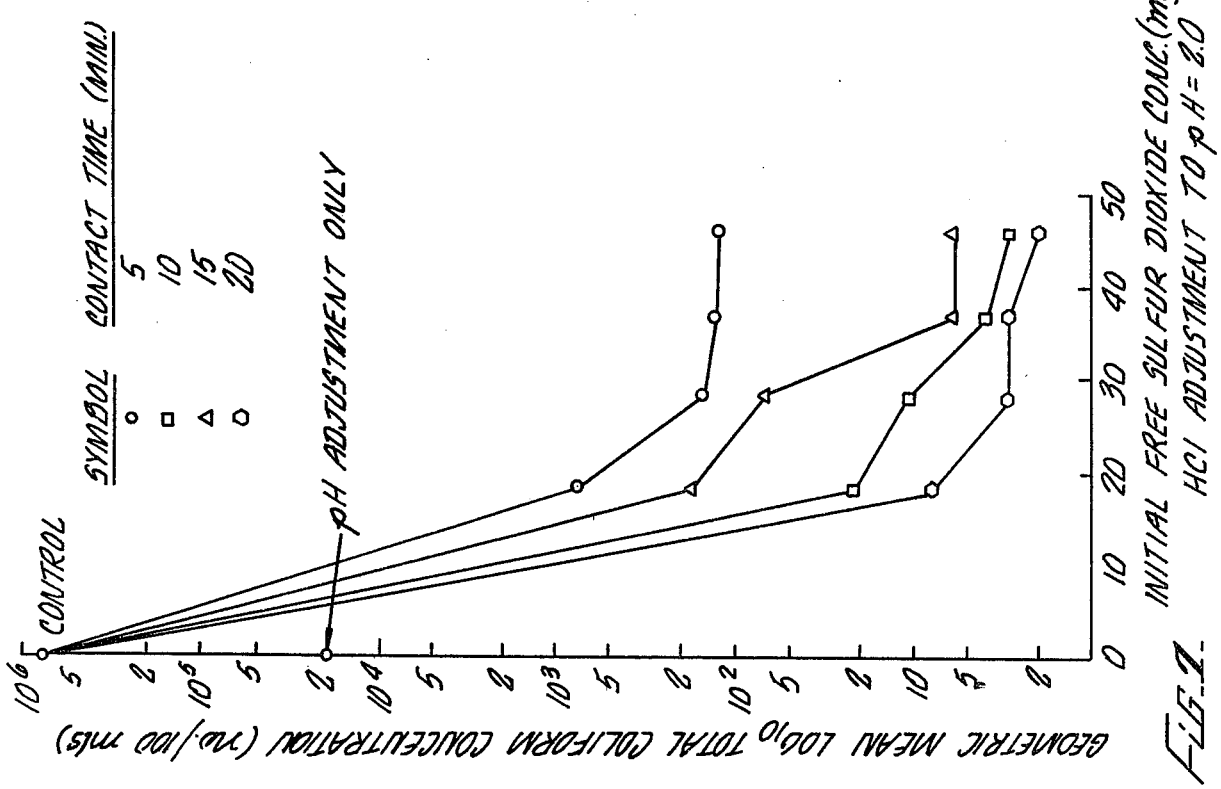
Figure 9:
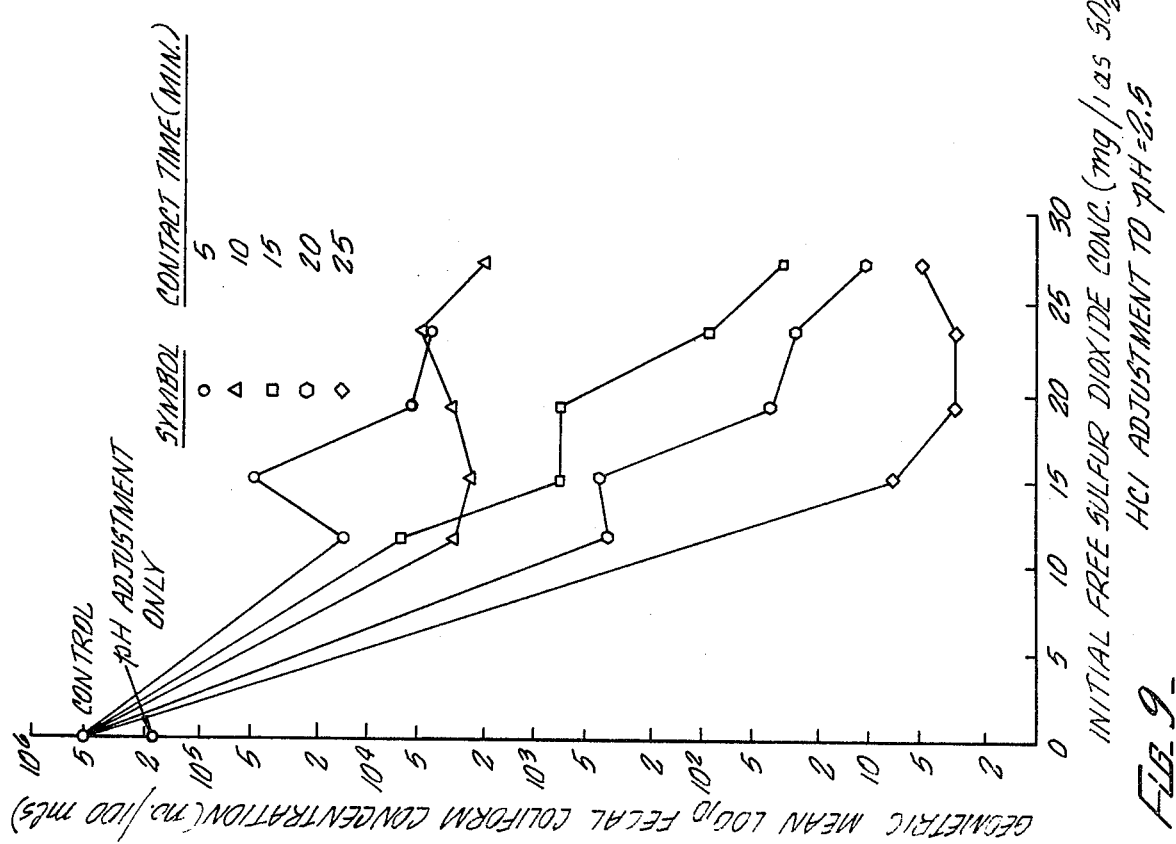

The initial free $SO_2$ contents of the samples were calculated from pH and the determined initial total $SO_2$ values. FIGS. 3 and 4 present the $\log_{10}$ total coliform concentration and fecal coliform concentration, respectively, as a function of the initial free $SO_2$ concentration for contact times of 3, 5, and 10 minutes with sulfuric acid adjustment to pH=2.5. FIGS. 5 and 6 present $\log_{10}$ total coliform concentration and fecal coliform concentration, respectively, versus initial free $SO_2$ concentration for contact times of 5 and 10 minutes with sulfuric acid adjustment to pH 2.5. FIGS. 7 and 8 present the $\log_{10}$ total coliform concentration and fecal coliform concentration, respectively, as a function of initial free $SO_2$ content for contact times of 5, 10, 15, and 20 minutes for hydrochloric acid adjustment to pH=2.0. FIGS. 9 and 10 present the $\log_{10}$ total coliform concentration and fecal coliform concentration, respectively, as a function of initial free $SO_2$ concentration for contact times of 5, 10, 15, 20, and 25 minutes for hydrochloric and adjustment to pH=2.5.

The 1985 State of Utah Total Coliform Discharge Standard is 200 total coliform per 100 ml. From FIG. 3, it is evident that this standard can be satisfied with a contact time of 10 minutes and an initial free $SO_2$ content of about 3 mg/liter using sulfuric acid for reducing the pH of the wastewater to 2.0. From FIG. 7, with a contact time of only 5 minutes, the total Coliform Standard can be satisfied with a free sulfur dioxide content of about 30 mg/liter as $SO_2$ using hydrochloric acid to reduce the pH of the wastewater to 2.0. From FIG. 9, with a contact time of 15 minutes, an initial free $SO_2$ concentration of about 20 mg/liter, and hydrochloric acid adjustment to pH=2.5, this standard can be met. (All $SO_2$ contents, including total and free $SO_2$ contents, expressed herein are based upon $SO_2$.)

From FIG. 4, the 1985 State of Utah Coliform Discharge Standard of 20 fecal coliform per 100 ml can be satisfied with a free sulfur dioxide content of about 5 mg/liter and a contact time of about 10 minutes using sulfuric acid to reduce the pH of the wastewater to 2.0.

From FIG. 8, it appears that the same standard can be met with hydrochloric acid adjustment to pH=2.0, and (1) a contact time of 10 minutes and an initial free $SO_2$ concentration of about 30 mg/liter, or (2) a contact time of 15 minutes and an initial free $SO_2$ content of about 18 mg/liter.

The process of the present invention not only can meet the State of Utah requirements, but also meets the 1983 Environmental Protection Agency standards for water discharged for irrigation, recreation, and industrial use. It is based upon a fundamental understanding of how a process utilizing $SO_2$ for disinfecting wastewater is to be controlled and operated for efficient and effective disinfection. By controlling the process based upon the free $SO_2$ content of the treated wastewater, it is possible to insure that coliform present in wastewater are disinfected. The disinfected water produced from the process is relatively clear and odor-free. Further, because chlorine is not used in the process, carcinogens produced with chlorine disinfection are not a problem.

A further advantage of the present invention over conventional methods for disinfecting wastewater with $SO_2$ is the use of acid to reduce the pH of the wastewater. In order to obtain an effective free $SO_2$ content in the wastewater, it is necessary that the pH be reduced to less than 4. In conventional processes, large portions of the $SO_2$ added to the wastewater function only to reduce the pH of the wastewater rather than contributing to the free $SO_2$ content of the wastewater. With the process of the present invention, the amount of $SO_2$ that needs to be added to the wastewater is substantially decreased, the amount needed generally only being about one-third the amount required in a conventional process. This reduces the cost of the $SO_2$ generator and the size of the mixing zone, with resulting savings in captial and operating costs.

Although the present invention has been described in considerable detail with reference to certain preferred versions thereof, other versions are possible. For example, in the version of the invention shown in FIG. 2, instead of having a separate mixing zone and separate pH reduction zone, the acid 8 can be added to the mixing zone 14, thereby eliminating the need for a pH reduction zone. Therefore, the spirit and scope of the appended claims should not be necessarily limited to the description of the preferred versions contained herein.

What is claimed is:

1. A continuous process for disinfecting wastewater containing infectious microorganisms comprising the steps of:
   (a) combining the wastewater with acid to reduce the pH of the wastewater and combining the wastewater with sufficient $SO_2$ so that the wastewater has a selected free $SO_2$ content of at least about 5 mg/liter and less than about 200 mg/liter and a pH of from about 1 to about 4;
   (b) maintaining the combined $SO_2$/wastewater in a treatment zone at the selected free $SO_2$ content and pH for about 5 to about 60 minutes; and
   (c) withdrawing wastewater from the treatment zone, the withdrawn wastewater containing substantially no infectious microorganisms.

2. A continuous process for disinfecting wastewater containing coliform bacteria comprising the steps of:
   (a) combining the wastewater with sufficient $SO_2$ and with sufficient acid that the wastewater has a selected free $SO_2$ of at least about 5 mg/liter and less than about 200 mg/liter, and the pH of the wastewater is reduced to a pH of from about 1 to less than about 4;
   (b) maintaining the combined $SO_2$/wastewater in a treatment zone at the selected free $SO_2$ content for about 10 to about 60 minutes; and
   (c) withdrawing wastewater from the treatment zone, the withdrawn wastewater containing substantially no coliform bacteria.

3. The process of claim 2 in which the step of maintaining comprises maintaining the combined $SO_2$/wastewater at the selected free $SO_2$ content in the substantial absence of particulate iron.

4. The process of claim 2 in which the step of maintaining comprises maintaining the combined $SO_2$/wastewater at the selected free $SO_2$ content without agitation.

5. The process of claim 1 or 2 in which the combined $SO_2$/wastewater is maintained in the treatment zone for about 10 to about 60 minutes.

6. The process of claim 1 or 2 in which the combined $SO_2$/wastewater is maintained in the treatment zone for about 10 to about 40 minutes.

7. The process of claim 1 or 2 in which the selected free $SO_2$ content is less than about 100 mg/liter.

8. The process of claim 1 or 2 in which the selected free $SO_2$ content is less than about 75 mg/liter.

9. The process of claim 1 or 2 in which the combined $SO_2$/wastewater is maintained in the treatment zone at a pH of from about 1 to about 4.

10. The process of claim 2 including the step of burning sulphur in the presence of no more than the amount of oxygen required to insure substantially complete oxidation of the sulphur to $SO_2$ to produce a combustion gas comprising $SO_2$ and no more than about 15% by volume oxygen.

11. The process of claim 10 wherein the step of combining comprises introducing the combustion gas without any additional oxygen into the wastewater.

12. The process of claim 1 or 2 in which the combined $SO_2$/wastewater is maintained in the treatment zone at a pH of from about 2 to about 3.

13. The process of claim 1 or 2 in which the step of combining with $SO_2$ comprises contacting a first portion of the wastewater with gaseous $SO_2$ to dissolve $SO_2$ therein and mixing the first portion with $SO_2$ dissolved therein with a second portion of the wastewater.

14. The process of claim 2 in which the $SO_2$ is gaseous.

15. The process of claim 1 or 2 in which the step of combining with $SO_2$ comprises mixing the wastewater with $SO_2$ dissolved in water.

16. The process of claim 1 or 2 in which the acid is sulfuric acid.

17. The process of claim 2 in which the acid is hydrochloric acid.

18. The process of claim 1 or 2 in which the wastewater is combined with acid before it is combined with $SO_2$.

19. The process of claim 1 or 2 in which the wastewater is combined with $SO_2$ before it is combined with acid.

20. The process of claim 1 or 2 in which the wastewater is combined with $SO_2$ and acid simultaneously.

21. The process of claim 1 or 2 including the step of stripping $SO_2$ from the withdrawn wastewater.

22. The process of claim 21 wherein the step of combining the wastewater with $SO_2$ comprises combining the wastewater with $SO_2$ stripped from withdrawn wastewater.

23. A continuous process for disinfecting wastewater containing infectious microorganisms comprising the steps of:
   (a) combining the wastewater with sufficient $SO_2$ so that the wastewater has a selected free $SO_2$ content of from about 10 to about 75 mg/liter;
   (b) reducing the pH of the combined $SO_2$/wastewater to a selected pH of from about 1 to about 4;
   (c) maintaining the combined $SO_2$/wastewater of reduced pH in a treatment zone at the selected free $SO_2$ content and the selected pH for about 10 to about 60 minutes;
   (d) withdrawing wastewater from the treatment zone, the withdrawn wastewater containing substantially no infectious microorganisms; and
   (e) neutralizing the wastewater withdrawn from the treatment zone to a pH of from about 6 to about 8 and dissolving oxygen in the wastewater withdrawn from the treatment zone to raise its oxygen content.

24. The process of claim 23 including the step of stripping $SO_2$ from the wastewater withdrawn from the treatment zone before the withdrawn wastewater is neutralized.

25. The process of claim 24 in which the step of combining the wastewater with $SO_2$ comprises combining the wastewater with $SO_2$ stripped from the withdrawn wastewater.

26. A continuous process for disinfecting wastewater containing infectious microorganisms comprising the steps of:
   (a) combining the wastewater with from about 10 to about 500 mg of $SO_2$ per liter of wastewater so that the wastewater has a selected free $SO_2$ content of from about 5 to about 100 mg/liter;

(b) combining the combined $SO_2$/wastewater with sufficient acid so that the wastewater has a selected pH of from about 1 to about 4;

(c) maintaining the combined $SO_2$/wastewater/acid in a treatment zone at the selected free $SO_2$ content and the selected pH for about 5 to about 60 minutes; and (d) withdrawing wastewater from the treatment zone, the withdrawn wastewater containing substantially no infectious microorganisms.

27. The process of claim 25 or 26 in which the wastewater is combined with no more than about 300 mg of $SO_2$ per liter of wastewater.

28. The process of claim 26 in which the wastewater is combined with at least about 20 mg of $SO_2$ per liter of wastewater.

29. A continuous process for disinfecting wastewater containing infectious microorganisms comprising the steps of:

(a) introducing a first portion of the wastewater and a $SO_2$ containing gas into a gas-liquid contact zone for dissolving at least a portion of the $SO_2$ into the first portion of the wastewater;

(b) withdrawing wastewater containing $SO_2$ from the contact zone;

(c) combining a second portion of the wastewater with $SO_2$ by introducing substantially all of the withdrawn wastewater containing $SO_2$ directly into a mixing zone and introducing the second portion of the wastewater into the mixing zone to form mixed wastewater;

(d) treating the mixed wastewater with sufficient acid to reduce the pH of the mixed wastewater to a selected pH of from about 1 to less than about 4;

(e) maintaining the acid treated wastewater in a treatment zone for about 5 to about 60 minutes; and (f) withdrawing treated wastewater from the treatment zone, the withdrawn wastewater containing substantially no infectious microorganisms, wherein sufficient $SO_2$ is introduced into the contact zone and sufficient acid is combined with the mixed wastewater so the water in the treatment zone has a selected free $SO_2$ content of at least about 5 to less than about 200 mg/liter.

30. The process of claim 29 in which the amount of $SO_2$ introduced into the contact zone is such that the wastewater in the treatment zone has a selected free $SO_2$ content of less than about 100 mg/liter.

31. The process of claim 29 in which the amount of $SO_2$ introduced into the contact zone is such that the wastewater in the treatment zone has a selected free $SO_2$ content of less than about 75 mg/liter.

32. The process of claim 29 in which the combined withdrawn wastewater and the second portion of the reduced pH wastewater are maintained in the treatment zone for a residence time of from about 5 to about 60 minutes.

33. The process of claim 29 in which sufficient $SO_2$ is introduced into the gas-liquid contact zone that the wastewater withdrawn from the contact zone has a free $SO_2$ content of at least about 10 mg/liter.

34. The process of claim 29 in which sufficient $SO_2$ is introduced into the gas-liquid contact zone that the wastewater withdrawn from the contact zone has a free $SO_2$ content of from about 10 to about 150 mg/liter.

35. The process of claim 29, 33, or 34 in which the first portion of the wastewater comprises from about 10 to about 70 volume percent of the total wastewater.

36. The process of claim 29 including the step of introducing $SO_2$ containing gas into the mixing zone.

37. The process of claim 29 in which the step of maintaining comprises maintaining the contents of the treatment zone at the selected free $SO_2$ content in the substantial absence of particulate iron.

38. The process of claim 29 in which the step of maintaining comprises maintaining the contents of the treatment zone unagitated.

39. The process of claim 29 including the step of stripping $SO_2$ from wastewater withdrawn from the treatment zone.

40. The process of claim 39 in which the step of introducing $SO_2$ into the gas-liquid contact zone comprises introducing $SO_2$ stripped from withdrawn wastewater into the gas-liquid contact zone.

41. A continuous process for disinfecting wastewater containing infectious microorganisms comprising the steps of:

(a) combining the wastewater with sufficient acid and sufficient $SO_2$ so that the wastewater has (i) a free $SO_2$ content of from about 5 to about 175 mg/liter and (ii) a pH of from about 1 to about 4;

(b) maintaining the combined $SO_2$/wastewater in a treatment zone at the selected free $SO_2$ content and the selected pH for about 5 to about 60 minutes;

(c) withdrawing wastewater from the treatment zone, the withdrawn wastewater containing substantially no infectious microorganisms;

(d) stripping $SO_2$ from the wastewater withdrawn from the treatment zone;

(e) removing contaminants from the stripped wastewater by increasing its pH to at least about 8, flocculating it, and removing flocculated material from the flocculated wastewater; and (f) neutralizing the flocculated wastewater and dissolving oxygen in the flocculated wastewater.

42. The process of claim 41 in which the step of combining the wastewater with $SO_2$ comprises combining the wastewater with $SO_2$ stripped from the wastewater withdrawn from the treatment zone.

43. A continuous process for disinfecting wastewater containing infectious microorganisms comprising the steps of:

(a) treating the wastewater by combining the wastewater with sufficient $SO_2$ so that the wastewater has a selected free $SO_2$ content of at least about 5 mg/liter and a pH of less than about 4;

(b) maintaining the combined $SO_2$ wastewater in a treatment zone at the selected free $SO_2$ content and pH for at least about 5 minutes;

(c) withdrawing wastewater from the treatment zone, the withdrawn wastewater containing substantially no infectious microorganisms;

(d) stripping $SO_2$ from the treated withdrawn wastewater; and (e) combining the $SO_2$ stripped from withdrawn wastewater with untreated wastewater.

44. The process of claim 43 including the additional step of combining wastewater having $SO_2$ stripped therefrom with a base to raise the pH of the wastewater.

45. The process of claim 43 including the step of combining the wastewater containing infectious microorganisms with acid.

* * * * *